United States Patent
Peters

(10) Patent No.: US 6,476,167 B2
(45) Date of Patent: Nov. 5, 2002

(54) END-FUNCTIONALIZED POLYOLEFIN PREPARED VIA RING OPENING METATHESIS POLYMERIZATION IN THE PRESENCE OF A NOVEL CHAIN TRANSFER AGENT, AND A PROCESS FOR THE PREPARATION OF THE END-FUNCTIONALIZED POLYOLEFIN VIA RING OPENING METATHESIS POLYERMIZATION

(75) Inventor: Mark A. Peters, Mt. Pleasant, SC (US)

(73) Assignee: Bayer Corporation, Pittsburgh, PA (US)

( * ) Notice: Subject to any disclaimer, the term of this patent is extended or adjusted under 35 U.S.C. 154(b) by 138 days.

(21) Appl. No.: 09/739,026

(22) Filed: Dec. 14, 2000

(65) Prior Publication Data

US 2002/0111447 A1 Aug. 15, 2002

(51) Int. Cl.[7] ................................. C08G 61/08
(52) U.S. Cl. .................... 526/209; 526/135; 526/171; 526/308
(58) Field of Search .................... 526/135, 209, 526/171, 308

(56) References Cited

U.S. PATENT DOCUMENTS

| | | | |
|---|---|---|---|
| 5,247,023 A | 9/1993 | Chung et al. | 525/288 |
| 5,312,940 A | 5/1994 | Grubbs et al. | 556/136 |
| 5,342,909 A | 8/1994 | Grubbs et al. | 526/171 |
| 5,403,904 A | 4/1995 | Nubel et al. | 526/139 |
| 5,512,635 A | 4/1996 | Nubel et al. | 525/247 |
| 5,519,101 A | 5/1996 | Nubel et al. | 526/142 |
| 5,559,190 A | 9/1996 | Nubel et al. | 525/270 |
| 5,589,543 A | 12/1996 | Yokelson et al. | 525/131 |
| 5,710,298 A | 1/1998 | Grubbs et al. | 556/22 |
| 5,728,917 A | 3/1998 | Grubbs et al. | 585/653 |
| 5,731,383 A | 3/1998 | Nubel et al. | 525/297 |
| 5,750,815 A | 5/1998 | Grubbs et al. | 585/511 |
| 5,831,108 A | 11/1998 | Grubbs et al. | 556/21 |
| 5,849,851 A | 12/1998 | Grubbs et al. | 526/93 |
| 5,880,231 A | 3/1999 | Grubbs et al. | 526/171 |
| 5,917,071 A | 6/1999 | Grubbs et al. | 556/21 |
| 5,990,340 A | 11/1999 | Haider et al. | 560/25 |
| 6,048,993 A | 4/2000 | Grubbs et al. | 556/21 |
| 6,060,570 A | 5/2000 | Nubel et al. | 526/308 |
| 6,111,121 A | 8/2000 | Grubbs et al. | 556/21 |
| 6,166,166 A | * 12/2000 | Taylor et al. | 528/65 |

OTHER PUBLICATIONS

Cell. Polym. (month unavailable) 1996, 15 (6), pp. 365–416, K. C. Frisch, et al, "Polyurethane Elastomers Based Upon Novel Hydrocarbon–Based Diols".

* cited by examiner

Primary Examiner—Fred Teskin
(74) Attorney, Agent, or Firm—Joseph C. Gil; N. Denise Brown

(57) ABSTRACT

This invention relates to novel end-functionalized, linear, non-crosslinked polyolefins without pendant chain branched groups, and to a process for the preparation of these end-functionalized, linear, non-crosslinked polyolefins. These non-crosslinked polyolefins comprise the reaction product of (A) a cyclic olefin monomer, with (B) a chain transfer agent, in the presence of (C) at least one catalyst, preferably a ruthenium metal carbene catalyst. The polyolefins of the present invention are characterized as having a functionality as defined by vapor phase osmometry (VPO) and end group titration in the range of from 1.7 to 2.2, and correspond to a specified structure. Suitable chain transfer agents for the presently claimed polyolefins comprise the reaction product of at least one unsaturated diol and at least one alkylene oxide in relative molar ratios of from 1:1 to 1:1000. These polyolefins are prepared via ring opening metathesis polymerization (ROMP).

22 Claims, No Drawings

END-FUNCTIONALIZED POLYOLEFIN PREPARED VIA RING OPENING METATHESIS POLYMERIZATION IN THE PRESENCE OF A NOVEL CHAIN TRANSFER AGENT, AND A PROCESS FOR THE PREPARATION OF THE END-FUNCTIONALIZED POLYOLEFIN VIA RING OPENING METATHESIS POLYERMIZATION

BACKGROUND OF THE INVENTION

The present invention relates to novel, end-functionalized, linear, non-crosslinked polyolefins without pendant chain branched groups, and to a process for the preparation of these end-functionalized, linear, non-crosslinked polyolefins without pendant chain branched groups. This process is improved over other known processes in that it utilizes a chain transfer agent free of protecting groups, and hence forms the end-functionalized, linear, non-crosslinked polyolefins directly, without the need of further purification or deprotection after polymerization.

Hydroxyl-end functionalized polybutadienes synthesized via Ring Opening Metathesis Polymerization (or ROMP) are disclosed in Chung et. al. (U.S. Pat. No. 5,247,023), Grubbs, et. al. (U.S. Pat. No. 5,750,815) and Nubel, et al (U.S. Pat. Nos. 5,512,635, 5,559,190, 5,519,101 and 5,403,904). However, these polybutadienes are synthesized in a 2-step process where the first step involves polymerization and the second step involves conversion of the polymer chain ends to hydroxyl functionality.

The use of transition metal complexes to catalyze metathesis reactions with functionalized olefins is well known. U.S. Pat. Nos. 6,048,993, 6,111,121, 5,917,071, 5,831,108, 5,710,298, 5,342,909 and 5,312,940 describe the synthesis of various metathesis catalysts useful for this purpose. U.S. Pat. Nos. 5,880,231, 5,849,851, 5,750,815, 5,728,917 and 5,559,190 describe processes by which these catalysts are used to make functionalized polymers. U.S. Pat. Nos. 6,060,570, 5,731,383, 5,880,231 and 5,990,340 describe processes for making end-functionalized linear non-crosslinked polyolefins without chain branched groups where the cyclic olefin (1,5-cyclooctadiene) and a functionalized chain transfer agent (1,4-diacetoxy-2-butene) were used for the synthesis of linear end-functionalized materials. The use of a difunctional chain transfer agent such as 1,4-diacetoxy-2-butene creates hydroxyl end-functionalized polybutadienes having a functionality of 2.0. In these examples, however, after polymerization, the chain ends must be converted into hydroxyl functionality to form the end-functionalized polyolefin.

The present invention relates to the use of a chain transfer agent that is designed to ensure efficient reaction with traditional metathesis catalysts and 1,5-cyclooctadiene but forms a hydroxyl end-functionalized polybutadiene directly, without the need for further purification of the polymer. U.S. Pat. No. 5,360,863 describes the synthesis of these CTAs and the subsequent incorporation of these materials in coating compositions.

Polyurethane elastomers made from these hydroxyl end-functionalized polybutadienes have been described previously (U.S. Pat. No. 5,589,543 and *Cell Polym* 1996, 15(6), 395). As described therein, hydroxyl end-functionalized polybutadiene was reacted with diisocyanates and extended with chain extenders to produce polyurethanes. In one example of using the one-shot procedure, molten diphenylmethyl diisocyanate (MDI) and butane diol are blended with the hydroxyl end-functionalized polybutadiene and the reaction mixture is compressed under elevated temperature and pressure to form the polyurethane. In another example, toluene diisocyanate (TDI) and the hydroxyl end-functionalized polybutadiene are reacted to form a prepolymer, and the resultant prepolymer was chain extended with methylene-bis-ortho chloroaridine (MbOCA). The mixture is then compressed under elevated temperature and pressure to form a polyurethane. The polyurethanes formed under these conditions had improved hydrolytic stability and reasonable mechanical properties. U.S. Pat. No. 5,990,340 also describes prepolymers made with hydroxyl end-functionalized polybutadiene and various diisocyanates.

Co-pending U.S. application Ser. No. 09/140,208 filed on Aug. 26, 1998, now U.S. Pat. No. 6,166,166which is commonly assigned, relates to a process for preparing thermoplastic polyurethane materials. This process comprises a) casting an NCO-terminated prepolymer with 1,4-butanediol to form a casting composition, b) extruding the casting composition to form a polyurethane elastomer, c) pelleting the polyurethane elastomer to form pellets, and d) processing the pellets to form a thermoplastic material. Suitable NCO-terminated prepolymers comprise the reaction product of a polyisocyanate with an end-functionalized, linear, non-crosslinked polyolefin without pendant chain-branched groups which is prepared by reacting 1,4-diacetoxy-2-butene with 1,5-cyclooctadiene in the presence of a ruthenium complex catalyst.

The processes known and described in the art relate to the synthesis of hydroxyl end-functionalized polybutadienes and require large quantities of organic solvents such as, for example, tetrahydrofuran (or similar solvent) to saponify acetate end-groups into hydroxyl functionality. Additionally, large quantities of methanol (or similar non-solvents) must be used in the polymer purification. These solvents increase both production costs and disposal costs. Tetrahydrofuran is a hazardous material, and thus, its use and treatment is expensive and environmentally unacceptable. Accordingly, it is desirable to develop a process for the production of hydroxyl end-functionalized, linear, non-crosslinked, polyolefins without pendant chain branched groups that does not require enormous quantities of these organic solvents.

In general, improvements in the production of hydroxyl end group functionalized polyolefins have focused on the catalysts used in the polymerization. It is the object of the present invention, however, to provide a process for the synthesis and purification of hydroxyl end-functionalized, linear, non-crosslinked, polyolefins without pendant chain branched groups through improvements to the chain transfer agent, and, thereby eliminating the need for purification or further processing after polymerization.

SUMMARY OF THE INVENTION

This invention relates to a novel, end-functionalized, linear, non-crosslinked polyolefin that is free of pendant chain branched groups, and to a process for the preparation of these end-functionalized, linear, non-crosslinked polyolefins that are free of pendant chain branched groups.

As used herein, the terminology "free from pendant chain branched groups" describes a polymer where no pendant chain branched group(s) is (are) created during the process of making the polymer. Polymerization of monomers or chain transfer agents containing pendant side chains such as phenyl rings, pendant functionality, alkyl chains, etc, which therefore create pendant chain branched groups in the resultant polymers are, however, considered to be within the scope of the present application. In other words, polymers having pendant chain branched groups which correspond to the pendant chain branched groups of the monomers used to prepare the polymers are within the scope of the present application. For example: the polymerization of 4-methylpentene creates a polymer which contains a pendant methyl group attached to every 5$^{th}$ carbon atom. Since this methyl group was present in the starting monomer, the resultant polymer is considered to be within the scope of the present invention.

The end-functionalized, linear, non-crosslinked polyolefin without pendant chain branched groups comprise the reaction product of: (A) a cyclic olefin monomer, with (B) a chain transfer agent comprising the reaction product of an unsaturated dihydric alcohol and an alkylene oxide, in the presence of (C) a catalyst, wherein the functionality of the polyolefin as defined by vapor phase osmometry (VPO) and end group titration ranges from 1.7 to 2.2, and the polyolefin has a structure corresponding to:

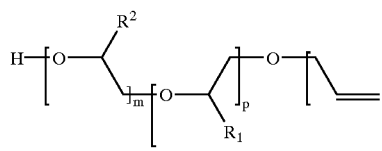

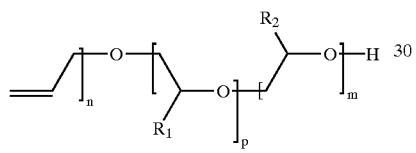

wherein:
  $R^1$: represents a hydrogen atom or an alkyl group, preferably an alkyl group having 1 to 6 carbon atoms;
  $R^2$: represents a hydrogen atom or an alkyl group, preferably an alkyl group having 1 to 6 carbon atoms;
  m: represents an integer from 0 to 1,000, preferably from 0 to 5;
  p: represents an integer from 0 to 1,000, preferably from 0 to 5; and
  n: represents an integer from 3 to 1,000, preferably from 3 to 200;
  wherein:
    the sum of p+m≧1.

The present invention also relates to a process for the preparation of an end-functionalized, linear, non-crosslinked polyolefin without pendant chain branched groups comprising:
  (l) polymerizing via ring opening metathesis:
    (A) a cyclic olefin monomer (preferably 1,4-cyclooctadiene); with
    (B) a chain transfer agent having the structure:

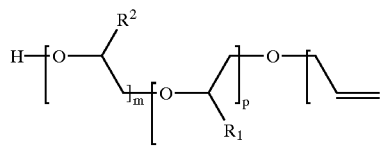

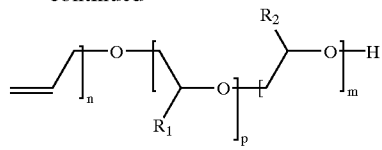

wherein:
  $R^1$: represents a hydrogen atom or an alkyl group, preferably an alkyl group having from 1 to 6 carbon atoms;
  $R^2$: represents a hydrogen atom or an alkyl group, preferably an alkyl group having from 1 to 6 carbon atoms;
  m: represents an integer from 0 to 1,000, preferably from 0 to 5;
  p: represents an integer from 0 to 1,000, preferably from 0 to 5; and
  n: represents an integer from 1 to 1,000, preferably 1;
  wherein:
    the sum of p+m≧1;
  said chain transfer agent being the reaction product of:
    (1) at least one unsaturated diol (preferably 2-butene-1,4-diol); and
    (2) at least one alkylene oxide (preferably propylene oxide);
  wherein components (1) and (2) are present in relative molar ratios of about 1:1 to 1:1000, preferably 1:2 to 1:4, and most preferably of about 1:2; in the presence of
  (C) a catalyst (preferably a ruthenium metal carbene catalyst).

The resultant linear, non-crosslinked polyolefin is free of chain branched groups, except of course for those arising directly from the structure of the CTA or the monomer, and is characterized by a functionality of from 1.7 to 2.2, preferably from 1.95 to 2.05, and most preferably of about 2.0.

Suitable chain transfer agents for the present invention include but are not limited to, for example, those known and described in, for example, U.S. Pat. No. 5,360,863, the disclosure of which is herein incorporated by reference. These chain transfer agents correspond to the general structure:

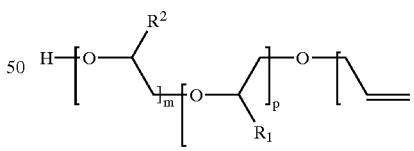

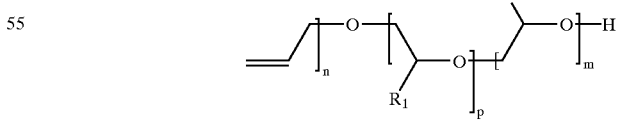

wherein:
  $R^1$: represents a hydrogen atom or an alkyl group, preferably an alkyl group having from 1 to 6 carbon atoms;
  $R^2$: represents a hydrogen atom or an alkyl group, preferably an alkyl group having from 1 to 6 carbon atoms;
  m: represents an integer from 0 to 1,000, preferably from 0 to 5;

p: represents an integer from 0 to 1,000, preferably from 0 to 5;

n: represents an integer from 1 to 1,000, preferably 1;

wherein:
the sum of p+m≧1.

These chain transfer agents comprise the reaction product of:
(1) at least one unsaturated diol (preferably 2-butene-1,4-diol); and
(2) at least one alkylene oxide (preferably propylene oxide);
wherein components (1) and (2) are present in relative molar ratios of about 1:1 to 1:1000, preferably of about 1:2 to 1:4, and most preferably of about 1:2.

DETAILED DESCRIPTION OF THE INVENTION

Suitable chain transfer agents for the present invention include those corresponding to the general structure:

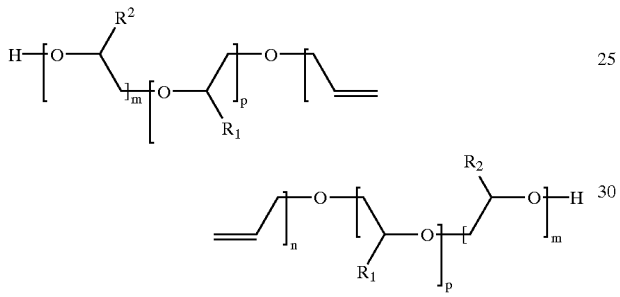

wherein:
R$^1$: represents a hydrogen atom or an alkyl group, preferably an alkyl group having from 1 to 6 carbon atoms;

R$^2$: represents a hydrogen atom or an alkyl group, preferably an alkyl group having from 1 to 6 carbon atoms;

m: represents an integer from 0 to 1,000, preferably from 0 to 5;

p: represents an integer from 0 to 1,000, preferably from 0 to 5;

n: represents an integer from 1 to 1,000, preferably 1;

wherein:
the sum of m+p≧1.

These chain transfer agents comprise the reaction product of:
(1) at least one unsaturated diol (preferably 2-butene-1,4-diol); and
(2) at least one alkylene oxide (preferably propylene oxide); wherein components (1) and (2) are present in relative molar ratios of about 1:1 to 1:1,000, preferably of about 1:2 to 1:4, and most preferably of about 1:2.

The end functionalized linear non-crosslinked polyolefins of the present invention are characterized as being free of pendant branched groups. These polyolefins are preferably polybutadienes, but other examples include polyethylene, polypropylene, polystyrene, poly(4-methylpentene), polynorbornene, poly(oxanonorbornene), etc. Polyolefins of the present invention have functionalities in the range of from 1.7 to 2.2, preferably about 2.0, as defined by vapor phase osmometry (VPO) and end group titration. VPO is generally measured by ASTM D3592.

The end-functionalized, linear, non-crosslinked polyolefins without pendant chain branched groups of the present invention correspond to the general structure:

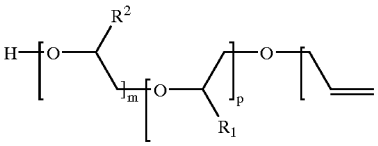

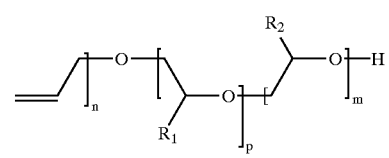

wherein:
R$^1$: represents a hydrogen atom or an alkyl group, preferably an alkyl group having 1 to 6 carbon atoms;

R$^2$: represents a hydrogen atom or an alkyl group, preferably an alkyl group having 1 to 6 carbon atoms;

m: represents an integer from 0 to 1,000, preferably from 0 to 5;

p: represents an integer from 0 to 1,000, preferably from 0 to 5; and n: represents an integer from 3 to 1,000, preferably from 3 to 200;

wherein:
the sum of p+m≧1.

These polyolefins comprise the reaction product of:
(A) a cyclic olefin monomer, with
(B) a chain transfer agent, in the presence of
(C) a catalyst.

In general, any cyclic olefin containing from about 4 to about 30 carbon atoms can be utilized in the presence of a functionalized olefin to prepare the olefinic compounds of this invention. The cyclic olefins include both mono- and polycyclic unsaturated hydrocarbon compounds. Representative examples of suitable polycyclic unsaturated hydrocarbon compounds include norbornene, norbornadiene, 2,2,2-bicyclooctene-2, dicyclopentadiene and the like.

The preferred unsaturated alicyclic compounds are those compounds which comprise a single unsaturated alicyclic ring. These alicyclic rings may be mono- or multi-substituted by such groups as alkyl, aryl, arylalkyl, and halogen groups.

Representative examples of unsaturated alicyclic compounds containing a single alicyclic ring having at least 4 and not more than 6 carbon atoms, preferably having 4 or 5 carbon atoms in the cyclic ring and containing one double bond in the ring, are cyclobutene, cyclopentene, and cyclohexene.

Representative examples of unsaturated alicyclic compounds containing at least six carbon atoms, preferably at least seven carbon atoms, in the cyclic ring and containing one or more (preferably more than one) non-conjugated carbon-to-carbon double bonds in the cyclic ring include cyclooctene; 1,4-cyclohexadiene; 1,4- and 1,5-cyclooctadiene;

1,4,7-cyclononatriene, cyclodecene, cyclododecene, 1,4-, 1,5- and 1,6-cyclodecadiene: 1,4-, 1,5-, 1,6- and 1,7-cyclododecadiene; 1,4,7- and 1,5,9-cyclododecatriene and the like.

The most preferred unsaturated alicyclic compounds of this invention are those containing from one to three carbonto-carbon double bonds in the ring and in which the double bonds are located in relation to each other in a manner that they are not adjacent and are non-conjugated. Representative examples of such preferred materials are cyclobutene, cyclopentene, cyclooctene, cyclododecene, and 1,5-cyclooctadiene, 1,5,9-cyclododecatriene and 1,9,17-cyclotetracosatriene.

Representative examples of substituted alicyclic compounds are alkyl-substituted compounds such as 1-methyl-1,5-cyclooctadiene; aryl-substituted compounds such as 3-phenyl-1-cyclooctene: aralkyl-substituted compounds such as 3-benzyl-1-cyclooctene; alkaryl-substituted compounds such as 3-tolyl-1-cyclooctene and halogen-substituted compounds such as a 5-chloro-1-cyclooctene, 1-chloro-1,5-cyclooctadiene; 5-chloro-1-cyclododecene and 5,6-dichloro-1-cyclooctene. Mixtures of the unsaturated alicyclic compounds are suitable, including both substituted unsaturated alicyclic compounds and the unsubstituted unsaturated alicyclic compounds.

Suitable chain transfer agents for the present invention include those which correspond to the general structure:

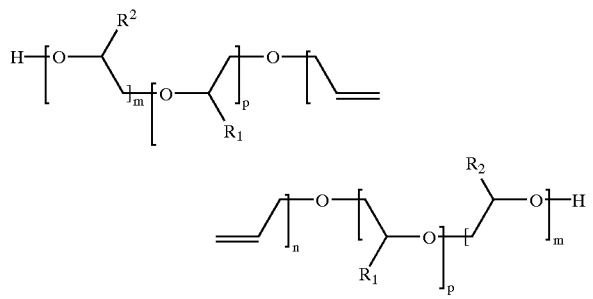

wherein:
$R^1$: represents a hydrogen atom or an alkyl group, preferably an alkyl group having from 1 to 6 carbon atoms;
$R^2$: represents a hydrogen atom or an alkyl group, preferably an alkyl group having from 1 to 6 carbon atoms;
m: represents an integer from 0 to 1,000, preferably from 0 to 5;
p: represents an integer from 0 to 1,000, preferably from 0 to 5; and
n: represents an integer from 1 to 1,000, preferably 1;
wherein:
the sum of $m+p \geq 1$.

These chain transfer agents comprise the reaction product of:
(1) at least one unsaturated diol as described above; and
(2) at least one alkylene oxide as described above;
wherein components (1) and (2) are present in relative molar ratios of about 1:1 to 1:1000, preferably of about 1:2 to about 1:4, and most preferably of about 1:2.

Examples of suitable chain transfer agents include compounds such as, for example, the reaction product of 2-butene-1,4-diol and ethylene oxide, the reaction product of 2-butene-1,4-diol and propylene oxide, the reaction product of 2-butene-1,4-diol with propylene oxide followed by the reaction with ethylene oxide in a sequential order (or vice versa), the reaction product of 2-butene-1,4-diol with a mixture of propylene oxide and ethylene oxide simultaneously, etc. A preferred chain transfer agent comprises the reaction product of 2-butene-1,4-diol and propylene oxide. Suitable chain transfer agents for the present invention can be prepared by the process described in, for example, U.S. Pat. No. 5,360,863, the disclosure of which is herein incorporated by reference.

Suitable unsaturated diols for component (1) above include alcohols such as, for example, dihydric alcohols having from 4 to 10 carbon atoms, preferably from 4 to 6 carbon atoms. Some examples of suitable dihydric alcohols include 2-butene-1,4-diol, etc. and mixtures of such compounds. The preferred chain transfer agent for the present invention is based on 2-butene-1,4-diol.

Suitable alkylene oxides for component (2) of the present invention include, for example, alkylene oxides having from 2 to 8 carbon atoms (preferably 3 to 6 carbon atoms), and having 1 epoxy group. Some examples of such compounds include ethylene oxide, propylene oxide, butylene oxide, styrene oxide, etc. and mixtures thereof. Propylene oxide is preferred.

The relative molar ratios of unsaturated diol(s) to alkylene oxide(s) are from about 1:1 to about 1:1000, preferably from about 1:2 to about 1:4, and most preferably of about 1:2.

The process for the preparation of an end-functionalized linear non-crosslinked polyolefin without pendant chain branched groups comprises:
(1) polymerizing via ring opening metathesis
  (A) a cyclic olefin monomer as described hereinabove; with
  (B) a chain transfer agent as described hereinabove, in the presence of
  (C) a catalyst (preferably a ruthenium metal carbene catalyst).

Suitable catalysts for the present invention include, for example, those as described in and prepared according to the process disclosed in, for example, U.S. Pat. No. 5,342,909, the disclosure of which is herein incorporated by reference. Other metathesis catalysts include transition metal catalysts such as those containing ruthenium, osmium, titanium, tungsten, and the like. Similar types of catalysts which are useful in the present invention also include those described in U.S. Pat. Nos. 5,142,190, 5,198,511, 5,296,566, 5,559,190, and 5,312,940, as well as U.S. Pat. No. 5,342,909, the disclosures of which are herein incorporated by reference. In a preferred embodiment of the present invention, the catalyst comprises a ruthenium metal carbene complex based compound. Most preferably, the catalyst comprises bis(tricyclohexylphosphine) benzylidene-ruthenium dichloride.

It is of course, also possible that additives are present in the process of the present invention. Suitable additives include, for example, antioxidants or other stabilizers such as, for example, light stabilizers or heat stabilizers, plasticizers, lubricants, etc.

The ring opening metathesis polymerization process (i.e., ROMP) which is used in the presently claimed process to prepare the end-functionalized polyolefins is known and described in the prior art. See, for example, U.S. Pat. No. 5,880,231, the disclosure of which is herein incorporated by reference.

The end-functionalized linear non-crosslinked polyolefins without pendant chain branched groups of the present invention can be used, for in example, as a new polymeric diol containing no ester or ether bonds which could be incorporated into various polyurethane applications and the like, to improve hydrophobicity, acid and base resistance, impact properties in current polymer formulations, etc. HFPB's may also find applications in polyurethane applications such as thermoplastic urethanes (TPU's), thin films, fibers, cast elastomers and the like.

The following examples further illustrate details for the preparation and use of the compounds of this invention. The invention, which is set forth in the foregoing disclosure, is not to be limited either in spirit or scope by these examples. Those skilled in the art will readily understand that known variations of the conditions and processes of the following preparative procedures can be used to prepare these compounds. Unless otherwise noted, all temperatures are degrees Celsius and all parts and percentages are parts by weight and percentages by weight, respectively.

EXAMPLES

Example 1: Comparative Example

Synthesis of Polymer with 1,4-Diacetoxy-2-butene

A clean, dry reactor was filled with nitrogen. The chain transfer agent 1,4-bis-acetoxy-2-butene (154 g. 1.8 moles) was distilled and added to the reactor. Then 1,5-dicyclooctadiene (99% stabilized, 1760 g., 32.5 moles) was added to the reactor and nitrogen was bubbled through the solution for 30 minutes. The catalyst, bis (tricyclohexylphosphine)-benylidene-ruthenium dichloride (3.06 g., 3.7 mmole) was dissolved in a minimal amount of methylene chloride under a nitrogen blanket and added to the reaction. The reactor was slowly heated until the mixture reached 50° C. Cooling was used to control the reaction temperature due to the slightly exothermic nature of this reaction. After 8 hours, vinyl acetate (0.625 g., 7.3 mmole) was added to the reaction mixture to deactivate the catalyst. The mixture was then stirred for another hour and cooled to 25° C.

Example 2: Comparative Example

Deprotection of Polymer Prepared in Example 1 Using Sodium Methoxide

The polymer prepared in Example 1 was dissolved in tetrahydrofuran (4 liters) and placed into a reactor which was cooled to 0° C. Sodium methoxide (809 g., 3.7 moles, 25% by wt. in methanol) was added dropwise over a time period of 40 minutes, and the mixture was stirred at 0° C. for 5 hours. The reaction mixture was warmed to 25° C., and precipitated into methanol (6 liters) containing concentrated hydrochloric acid (HCl). The pH of the system was controlled to maintain the pH between 4 and 5. The methanol solution was then decanted and the polymer solution was precipitated into methanol (6 liters) containing hydroxyl acid (500 ml, 1N), washed three (3) times with 6 liters of 30 methanol containing 500 ml of water, and then washed two (2) times with 6 liters of methanol. The methanol layer was then removed via decantation. The polymer was then further purified by removing excess solvent via vacuum distillation. The polymer is then further purified by removing excess solvent via vacuum distillation. Molecular weight of this polymer measured via vapor phase osmometry was 2210 g/mole, and the OH number was 56.4 mg KOH/g polymer. The functionality of this polymer was 2.2.

Example 3 demonstrates the synthesis of the polyether-CTAs in accordance with the present invention, and Examples 4-9 demonstrate the polymerization of 1,5-cyclooctadiene in the presence of other polyether-CTAs.

Example 3

Synthesis of Polyether Chain Transfer Agents

2-Butene-1,4-diol was charged to a nitrogen flushed, 5-gallon, stainless steel reactor at room temperature. A 46% solution of potassium hydroxide in water was charged to the reactor. The reactor was sealed and purged by evacuation and breaking with nitrogen three times. Water was then removed to ca. 0.1% by vacuum distillation (110° C. and 10 mm Hg). Oxides were charged at 107° C. and at a rate to maintain 45 psia followed by post reaction of one hour for ethylene oxide (EO) and three hours for propylene oxide (PO) as appropriate. The reaction mixture was cooled to 80° C. and neutralized with ca. 3.3% sulfuric acid. Water was distilled (atmospheric followed by vacuum to 110° C. and 10 mm Hg) and the salts were removed by pressure filtration.

Batch charges are summarized in Table 1 below.

TABLE 1

Batch Charges for Synthesis of Polyether CTAs

| Example/Description | Butenediol (g) | 46% KOH (g) | Block 1 (g) | Block 2 (g) | 20% $H_2SO_4$*(g) |
|---|---|---|---|---|---|
| Example A: PO-CTA | 613.4 | 22.2 | 1616 (PO) | | 40.6 |
| Example B: EO-CTA | 606.9 | 20.6 | 1215 (EO) | | 42.7 |
| Example C: PO-EO-CTA | 608.8 | 21.8 | 608 (PO) | 608 (EO) | 45.1 |
| Example D: EO-PO-CTA | 608.3 | 21.0 | 608 (EO) | 608 (PO) | 43.5 |

*diluted to ca. 3.3%

TABLE 2

Properties of Polyether CTAs

| Example/Description | OH # (mg KOH/g) | Acid # (mg KOH/g) | Water (%) | Color (Gardener) | pH (9/1 MeOH/$H_2O$) | Viscosity mPa.s at 25° C.) |
|---|---|---|---|---|---|---|
| Example A: PO-CTA | 402 | 0.340 | 0.034 | 4 | 5.3 | 59 |
| Example B: EO-CTA | 436 | 0.740 | 0.038 | 14 | 5.3 | 57 |
| Example C: PO-EO-CTA | 463 | 0.590 | 0.040 | 18 | 5.4 | 56 |
| Example D: EO-PO-CTA | 490 | 0.529 | 0.035 | 11 | 5.3 | 60 |

Example 4

Synthesis of Polymers with PO-CTA

The synthesis of polymers using the polyether chain transfer agents was performed using the following procedure. A reactor was cleaned, dried and filled with nitrogen. The chain transfer agent (all PO, 25.4 g.) from Example A above, and 1,5-cyclooctadiene (99%, stabilized, 90 g. 0.83 moles) was added to the reactor and nitrogen was bubbled through the solution for 30 minutes. The catalyst, bis (tricyclohexylphosphine)-benylidene-ruthenium dichloride (0.32 g., 0.39 mmole) was dissolved in a minimal amount of methylene chloride under a nitrogen blanket and added to the reactor containing the reaction mixture. The reaction mixture was slowly heated to 50° C. Cooling was used to control the reaction mixture since the reaction was mildly exothermic. After 8 hours, vinyl acetate (0.625 g., 7.3 mmole) was added to the reactor to deactivate the catalyst. The mixture was stirred for one hour and cooled to 25° C. The polymer was then precipitated into excess methanol twice. The methanol was decanted and the polymer dried in a vacuum oven to a constant weight. The molecular weight of the resulting polymer was 2170 g/mole, based on vapor phase osmometry, the OH# was 52.2 mg KOH/g, and the functionality was 2.0.

Example 5

Synthesis of Polymers with EO-PO-CTA

The same procedure was used as described in Example 4 above, with the exception that the EO-PO-CTA from Example D above was used.

The molecular weight of the resulting polymer was 1950 g/mole, based on vapor phase osmometry, the OH# was 49.9 mg KOH/g, and the functionality was 1.7.

Example 6

Synthesis of Polymers with EO-CTA

The same procedure was used as described in Example 4 above, with the exception that the EO-CTA from Example B above was used. This CTA was not soluble in 1,5-cyclooctadiene. After polymerization, a heterogeneous mixture was formed. This mixture eventually phase separated into two (2) distinct layers. No further evaluation of this polymer mixture was performed.

Example 7

Synthesis of Polymers with PO-EO-CTA

The same procedure was used as described in Example 4 above, with the exception that the PO-EO-CTA from Example C above was used. In this case, this initial solution of monomer and CTA was cloudy, but after polymerization, a heterogeneous mixture was formed.

The molecular weight of the resulting polymer was 2300 g/mole, based on vapor phase osmometry, the OH# was 41.3 mg KOH/g, and the functionality was 1.7.

Example 8

Synthesis of Higher Molecular Weight Polymers Using the PO-CTA

The same procedure was used as described in Example 4 above, except the quantity of CTA (from Example A) was decreased to produce a higher molecular weight polymer. The 1,5-cyclooctadiene was used in an amount of 90.0 g (0.83 moles), the CTA was used in an amount of 6.56 g., and the catalyst was used in an amount of 0.32 g (0.39 mmole).

The molecular weight of the resulting polymer was 4830 g/mole, based on vapor phase osmometry, the OH# was 24.7 mg KOH/g, and the functionality was 2.1.

Example 9

Synthesis of Higher Molecular Weight Polymers Using the PO-CTA

The same procedure was used as described in Example 4 above, except the quantity of CTA (from Example A) was decreased to produce a higher molecular weight polymer. The 1,5-cyclooctadiene was used in an amount of 90.0 g (0.83 moles), the CTA was used in an amount of 4.37 g, and the catalyst was used in an amount of 0.32 g (0.39 mmole).

The molecular weight of the resulting polymer was 7030 g/mole, based on vapor phase osmometry, the OH# was 15.6 mg KOH/g, and the functionality was 2.0.

In the working examples, the VPO (Vapor Phase Osmometry) was measured in accordance with ASTM D3592.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An end-functionalized, linear, non-crosslinked polyolefin without pendant chain branched groups comprising the reaction product of:

(A) a cyclic, olefin monomer, with (B) a chain transfer agent, in the presence of (C) a catalyst, characterized in that the functionality of said olefin as defined by vapor phase osmometry (VPO) and end group titration ranges from 1.7 to 2.2, wherein said polyolefin has a structure corresponding to:

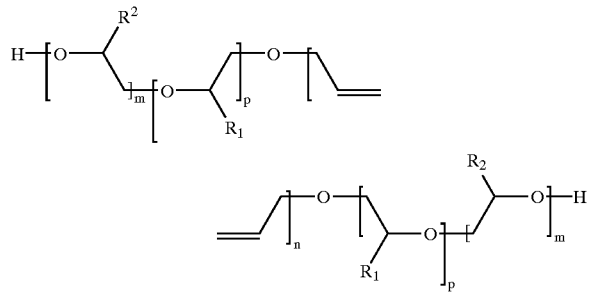

wherein:

$R^1$: represents a hydrogen atom or an alkyl group;

$R^2$: represents a hydrogen atom or an alkyl group;

m: represents an integer from 0 to 1,000;

p: represents an integer from 0 to 1,000; and n: represents an integer from 3 to 1,000;

wherein:

the sum of $p+m \geq 1$.

2. The end-functionalized, linear, non-crosslinked polyolefin without pendant chain branched groups of claim 1, wherein:

$R^1$: represents an alkyl group having from 1 to 6 carbon atoms, and $R^2$: represents an alkyl group having from 1 to 6 carbon atoms.

3. The end-functionalized, linear, non-crosslinked polyolefin without pendant chain branched groups of claim 1, wherein:

m: represents an integer from 0 to 5, p: represents an integer from 0 to 5, and n: represents an integer from 3 to 200.

4. The end-functionalized, linear, non-crosslinked polyolefin without pendant chain branched groups of claim 1, wherein:

$R^1$: represents a hydrogen atom or a methyl group, and $R^2$: represents a hydrogen atom or a methyl group.

5. The end-functionalized, linear, non-crosslinked polyolefin without pendant chain branched groups of claim 1, wherein:

(B) said chain transfer agent corresponds to the general structure:

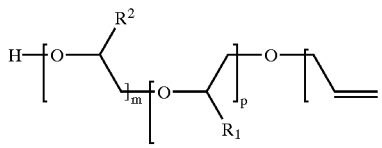

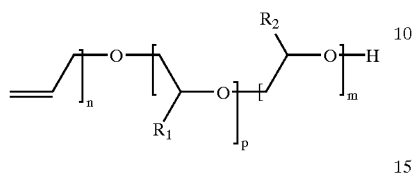

wherein:
R$^1$: represents a hydrogen atom or an alkyl group;
R$^2$ represents a hydrogen atom or an alkyl group;
m: represents an integer from 0 to 1,000;
p: represents an integer from 0 to 1,000; and
n: represents an integer from 1 to 1,000;
wherein:
the sum of p+m$\geq$1.

6. The end-functionalized, linear, non-crosslinked polyolefin without pendant chain branched groups of claim 5, wherein in (B) said chain transfer agent:
R$^1$: represents an alkyl group having from 1 to 6 carbon atoms;
R$^2$: represents an alkyl group having from 1 to 6 carbon atoms;
m: represents an integer from 0 to 5;
p: represents an integer from 0 to 5; and
n: represents 1.

7. The end-functionalized, linear, non-crosslinked polyolefin without pendant chain branched groups of claim 1, wherein:
(A) said cyclic olefin monomer comprises 1,4-cyclooctadiene.

8. The end-functionalized, linear non-crosslinked polyolefin without pendant chain branched groups of claim 1, wherein:
(B) said chain transfer agent comprises the reaction product of:
(1) at least one unsaturated diol, and
(2) at least one alkylene oxide,
wherein components (1) and (2) are present in relative molar ratios of about 1:1 to 1:1,000.

9. The end-functionalized, linear, non-crosslinked polyolefin without pendant chain branched groups of claim 8, wherein:
(B)(1) said unsaturated diol comprises 2-butene-1,4-diol.

10. The end-functionalized, linear, non-crosslinked polyolefin without pendant chain branched groups of claim 8, wherein:
(B)(2) said alkylene oxide comprises propylene oxide, ethylene oxide, or mixtures thereof.

11. The end-functionalized, linear, non-crosslinked polyolefin without pendant chain branched groups of claim 10, wherein:
(B)(2) said mixtures of propylene oxide and ethylene oxide are reacted sequentially or simultaneously with (B)(1).

12. The end-functionalized, linear, non-crosslinked polyolefin without pendant chain branched groups of claim 1, wherein:

(C) said catalyst comprises bis(tricyclohexylphosphine)-benzylidene-ruthenium dichloride.

13. A process for the preparation of an end-functionalized, linear, non-crosslinked polyolefin without pendant chain branched groups comprising:
(I) polymerizing via ring-opening metathesis
(A) a cyclic olefin monoiner, with
(B) a chain transfer agent having the structure:

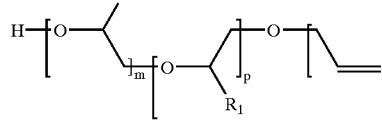

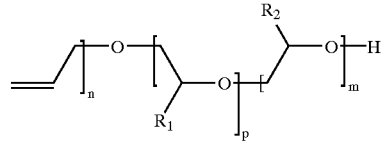

wherein:
R$^1$: represents a hydrogen atom or an alkyl group;
R$^2$: represents a hydrogen atom or an alkyl group;
m: represents an integer from 0 to 1,000;
p: represents an integer from 0 to 1,000; and
n: represents an integer from 1 to 1,000;
wherein:
the sum of m+p$\geq$1;
said chain transfer agent being the reaction product of:
(1) at least one unsaturated diol; and
(2) at least one alkylene oxide;
wherein components (1) and (2) being present in relative molar ratios of about 1:1 to about 1:1,000;
in the presence of
(C) a catalyst.

14. The process of claim 13, wherein:
R$^1$: represents an alkyl group having from 1 to 6 carbon atoms;
R$^2$: represents an alkyl group having from 1 to 6 carbon atoms;
m: represents an integer from 0 to 5;
p: represents an integer from 0 to 5; and
n: represents 1;
wherein:
the sum of m+p$\geq$1.

15. The process of claim 13, wherein (A) said cyclic olefin monomer comprises 1,4-cyclooctadiene.

16. The process of claim 13, wherein said chain transfer agent comprises the reaction product of:
(1) at least one unsaturated diol comprising 2-butene-1,4-diol; and
(2) at least one alkylene oxide comprising propylene oxide, ethylene oxide, or mixtures thereof.

17. The process of claim 13, wherein (A) said catalyst comprises a ruthenium metal carbene catalyst.

18. The process of claim 13, wherein the resultant end-functionalized, linear, non-crosslinked polyolefin without pendant chain branched groups corresponds to the general structure:

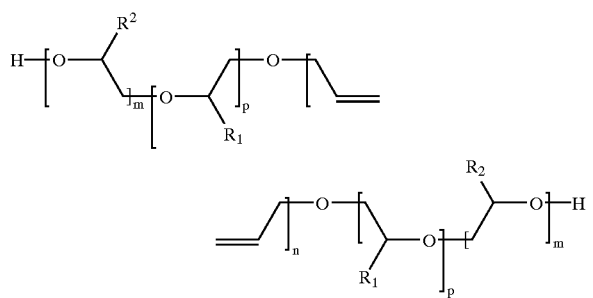

wherein:
R¹: represents a hydrogen atom or an alkyl group;
R²: represents a hydrogen atom or an alkyl group;
m: represents an integer from 0 to 1,000;
p: represents an integer from 0 to 1,000; and
n: represents an integer from 3 to 1,000;

wherein:
the sum of p+m≧1.

19. The process of claim 13, wherein the resultant end-functionalized, linear, non-crosslinked polyolefin without pendant chain branched groups is characterized by a functionality, as defined by vapor phase osmometry (VPO) and end group titration, ranging from 1.7 to 2.2.

20. The process of claim 13, wherein components (1) said unsaturated diol and (2) said alkylene oxide are present in relative molar ratios of about 1:2 to about 1:4.

21. The process of claim 16, wherein:
(B)(2) said mixtures of propylene oxide and ethylene oxide are reacted sequentially or simultaneously.

22. The process of claim 17, wherein
(C) said ruthenium metal carbene catalyst comprises bis(tricyclohexylphosphine)-benziledene-ruthenium dichloride.

* * * * *